(12) United States Patent
Hunter et al.

(10) Patent No.: US 8,119,085 B2
(45) Date of Patent: Feb. 21, 2012

(54) HEAP LEACHING OF SULPHIDE ORES

(75) Inventors: Colin John Hunter, Western Australia (AU); Tamsin Lisa Williams, Western Australia (AU)

(73) Assignee: Bioheap Limited, Northridge (AU)

( * ) Notice: Subject to any disclaimer, the term of this patent is extended or adjusted under 35 U.S.C. 154(b) by 909 days.

(21) Appl. No.: 11/909,454

(22) PCT Filed: Mar. 17, 2006

(86) PCT No.: PCT/AU2006/000343
§ 371 (c)(1),
(2), (4) Date: Jun. 23, 2008

(87) PCT Pub. No.: WO2006/099659
PCT Pub. Date: Sep. 28, 2006

(65) Prior Publication Data
US 2009/0061503 A1 Mar. 5, 2009

(30) Foreign Application Priority Data
Mar. 21, 2005 (AU) ................................ 2005901367

(51) Int. Cl.
*B01D 11/00* (2006.01)
*E21B 43/28* (2006.01)
*C22B 15/00* (2006.01)

(52) U.S. Cl. .................... 423/27; 423/DIG. 17; 75/712; 75/743

(58) Field of Classification Search .................... 423/27, 423/DIG. 17; 75/712, 743
See application file for complete search history.

(56) References Cited

U.S. PATENT DOCUMENTS

| 5,246,486 A | 9/1993 | Brierley et al. |
|---|---|---|
| 5,688,304 A | 11/1997 | Kohr et al. |
| 5,873,927 A | 2/1999 | Schaffner et al. |
| 6,083,730 A | 7/2000 | Kohr |
| 6,110,253 A | 8/2000 | Kohr et al. |
| 6,207,443 B1 | 3/2001 | King |
| 2004/0131520 A1 | 7/2004 | Bruynesteyn |
| 2004/0206206 A1 | 10/2004 | Furlong et al. |

FOREIGN PATENT DOCUMENTS

| WO | 98/51827 A1 | 11/1998 |
|---|---|---|
| WO | 01/18264 A1 | 3/2001 |
| WO | 2004/081241 A1 | 9/2004 |
| WO | 2005/056842 A1 | 6/2005 |

*Primary Examiner* — Maryam Monshipouri
(74) *Attorney, Agent, or Firm* — Rothwell, Figg, Ernst & Manbeck, P.C.

(57) ABSTRACT

A process for the heap leaching of multiple ores, the process characterized by the process steps of: (i) the agglomeration or wetting of an ore feed; (ii) exposing the agglomerated or wetted ore to an inoculum containing one or more bacterial species capable of biooxidizing sulphide minerals in that ore; (iii) forming one or more heaps from the ore of step (ii); (iv) dispersing further bacterial inoculum over at least a portion of the or each heap; and (v) recovering leach solution draining from the heap and passing a portion thereof to a means for metal recovery.

28 Claims, 2 Drawing Sheets

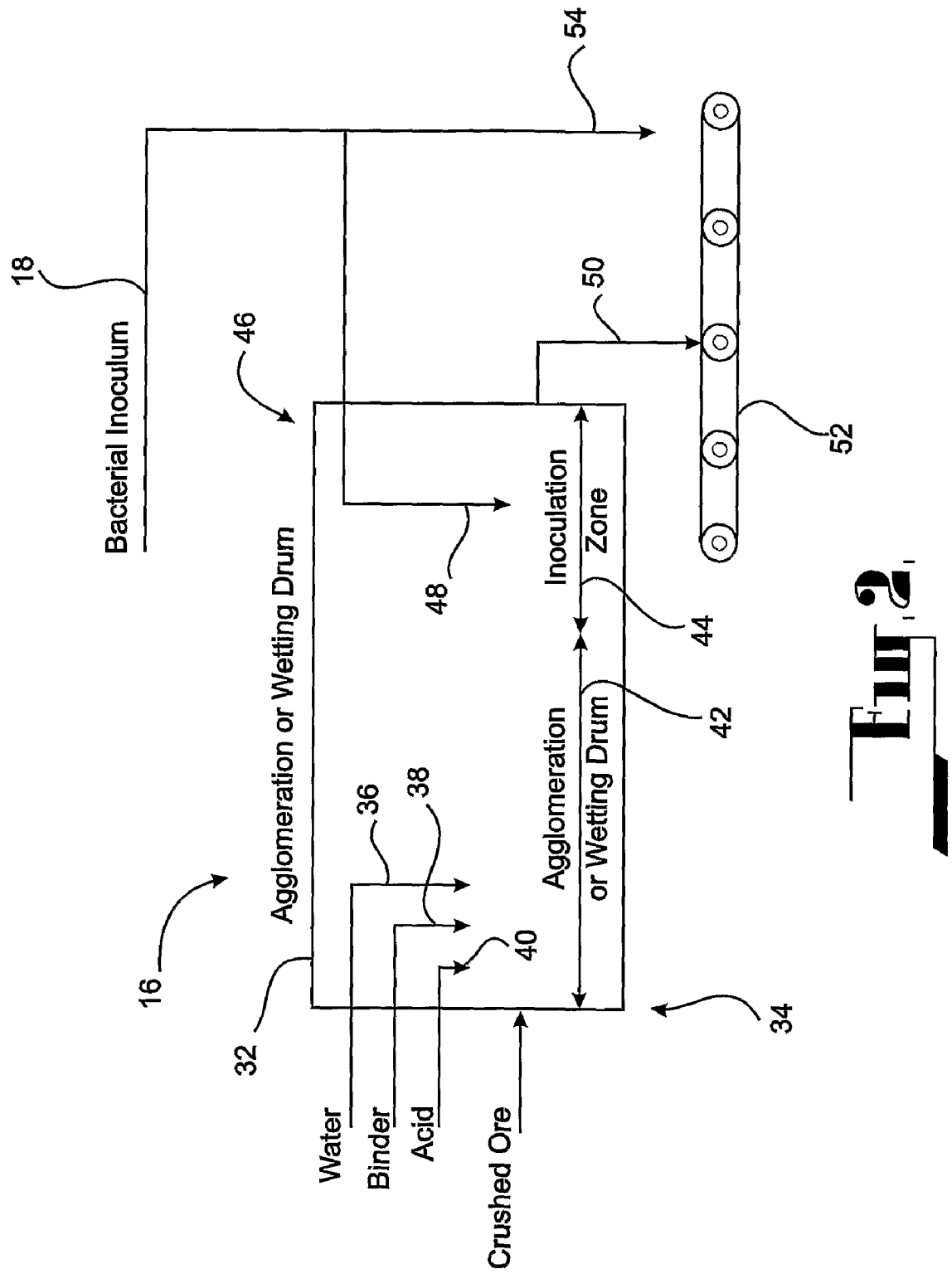

HEAP LEACHING OF SULPHIDE ORES

CROSS REFERENCE TO RELATED APPLICATIONS

This application is a 35 U.S.C. §371 National Phase Entry Application from PCT/AU2006/000343, filed Mar. 17, 2006, and designating the United States. This application also claims priority of Australian Patent Application No. 2005901367, filed Mar. 21, 2005, the disclosure of which is incorporated herein in its entirety by reference.

FIELD OF THE INVENTION

The present invention relates to the heap leaching of sulphide ores. More particularly, the present invention relations to the biooxidation of sulphide ores in heaps, at least one of such heaps being formed of ore to which a bacterial inoculum has been applied prior to the stacking of the heap.

BACKGROUND ART

Heap leaching is one available option for the leaching of precious and base metals from, generally, low grade ores or waste materials. Biooxidation using a range of micro-organisms is one option for such a leach. Such biooxidation is variously described as the primary leach with an acid lixiviant or as a preconditioning step prior to, for example, a cyanidation step.

U.S. Pat. No. 6,207,443, assigned to Placer Dome, Inc., describes a process for the biooxidation of sulphide ores in which a previously biooxidised material is incorporated into a heap. A first portion of a feed material containing metal sulphides is biooxidised in a heap or vat to form a biooxidised fraction. That biooxidised fraction is subsequently combined with a second portion of the feed material, forming a combined feed material. That combined feed material may then be used to form a further heap. Biooxidation is performed in the further heap through the application of an inoculum comprising sulphuric acid and suitable microbes, with or without suitable nutrients. This lixiviant is allowed to percolate through the heap and the pregnant leach solution is removed at the base of that heap.

The manner in which the biooxidised residue from the first heap is combined with the second portion of the ore is by way of either the introduction of both ore feeds into the agglomerate or both may be placed directly onto a conveyor belt to the further heap. A further alternative is to place the biooxidised residue onto the top of a heap already formed from the second feed portion.

There are problems associated with combining the two feeds prior to the agglomerater as the conditions within the agglomerater are particularly harsh on the microbes present, particularly if the microbes must be present through the entire agglomeration process. The problem associated with the alternate versions of the combination of the two steams described above is that it is unlikely that all of the second stream or portion of ore is exposed to the microbes present in the biooxidised residue. Similarly, there is no mechanism by which it can be assured that a significant proportion of the second stream or portion of feed ore is exposed to the inoculum/lixiviant administered to the further heap. Such a heap is subject to the traditional problems associated with heap leaching, being, amongst other things, channelling.

U.S. Pat. No. 6,083,730, assigned to Geobiotics, Inc., describes a heap biooxidation process in which the heap is comprised of substrates, such as coarse ore particles, onto which a concentrate prepared from the ore to be biooxidised is coated. This coating occurs in an agglomerator prior to the stacking of the heap. The heap is then inoculated, in the typical manner, with bacteria capable of bio-oxidising the metal sulphide particles within the concentrate coated on the substrates. This inoculation occurs either during the stacking of the heap or immediately thereafter. This process seeks to expose as much metal sulphide to the lixiviant as possible through the fine coating of the substrates forming the heap. However, there is not described any mechanism by which the microbes for bio-oxidation are effectively evenly distributed throughout the heap.

In U.S. patent application Ser. No. 10/723,392 (Publication No. US 2004/0131520 A1) to Bruynesteyn, a process for the leaching of low sulphur content ores is described. This process includes a mechanism by which finely milled elemental sulphur is exposed to a culture of sulphur oxidising bacteria as a preconditioning step in which the sulphur particles are wetted and the bacteria attach themselves to those sulphur particles. The resulting combination of preconditioned sulphur, water and bacteria is then added to ore particles during a typical agglomeration process. This process focuses on the production of sulphuric acid during preconditioning, that sulphuric acid being used to partially satisfy the acid demand of the ore in the heap ultimately formed. Again, it is apparent that the sulphur oxidising bacteria are subjected to the entire agglomeration process and its harsh environment.

In U.S. Pat. No. 5,246,486 assigned to Newmont Gold Co. and Newmont Mining Corporation, there is described a process for the biooxidation of sulphides in a heap. One of the key components of this process is the formation of "particulates" from the sulphide ore particles. An inoculate is used in the formation of these particulates, the inoculum being described as sprayed on the ore whilst on the stacking conveyor, which process is indicated to reflect agglomeration as it is generally known. It is also noted in this specification that other processes may be employed for the particulate formation, including disc type agglomeration devices. Further, reference is made to dipping of ore into a liquid bath on a conveyor, and also to the use of screw extruders.

The particulates formed as described above are subsequently used in the stacking of the heap. It is suggested that the formation of a heap in this manner results in efficient leaching upon the subsequent dispersing of a leaching solution, with or without additional nutrients, through the heap in known manner. Whilst the distribution of the inoculum throughout the heap by way of formation of the particulates is advantageous, the microbes of the inoculum are again subject to severe physical conditions during agglomeration, including prolonged exposure to abrasive forces which may reduce their effectiveness in the heap ultimately formed.

In International Patent Application PCT/IB98/00969 (Publication No. WO 98/51827), to Echo Bay Mines Limited, an integrated tank/heap bio-oxidation process for use on sulphide ores is described. The process involves the splitting of a refractory sulphide ore source into two steams. The first of these streams is exposed to a sulphide digesting microorganism in a tank reactor for the acclimatisation of the microorganism to the particular sulphide ore, after which the partially digested ore is combined with the second stream of sulphide ore. It is subsequently solid/liquid separated (dewatered) and the solid portion, with or without an agglomeration step, used to construct a heap. The liquid from the solid/liquid separation step is then used to inoculate the heap and perform the biooxidisation process. Subsequent to the biooxidation step the heap is subjected to a lixiviation process, such as cyanidation. As noted, solids and liquids from the biooxidation reactor are passed in turn to the thickener, the content of which ultimately passes to solids/liquids separation. After separation, the entire content is effectively recombined in the heap leach. This creates a very step-wise or batch-like process which may introduce limitation as to how effectively the process may be practised. Further, the solids/liquids separation or dewatering step, in conjunction with the agglomeration step for the solids therefrom prior to stacking of the heap again exposes microorganisms to relatively harsh physical conditions. Also, the inoculum is subsequently applied to the heap in much the same manner as the majority of the prior art, by way of percolation through the heap.

As noted above, many patent specifications describe biooxidation processes in a heap leach environment, together with the inoculation of the ore and/or the heap. However, little or no description is provided with regard to the manner in which cultures of appropriate micro-organisms for bio-oxidation are produced, maintained, handled and transported in sufficient volumes for commercial heap leaching operations. This in itself is a difficult and complicated exercise.

A wide range of bacterial species have been described as suitable for, or present in, biooxidation processes of the type described above. These include *Thiobacillus Ferrooxidans; Thiobacillus Thiooxidans; Thiobacillus Organoparus; Thiobacillus Acidphilus; Sulfobacillus Thermosulfidooxidans; Sulfolobus Acidocaldarius, Sulfolobus* BC; *Sulfolobus Solfataricus; Acidanus Brierley*; and *Leptospirillum Ferrooxidans*. These species are generally described as indigenous to the ore to be biooxidised and the conditions of the leach are provided to allow the indigenous bacterial species to thrive and effect the biooxidation process.

The temperature at which the heap leach operates has an impact upon those bacterial species that will be most active in the biooxidation process. This often also impacts upon the efficiency/effectiveness of the leach. This in turn will affect the recovery of metal from pregnant leach solution in downstream metal recovery steps. Such issues are heightened when attempting to biooxidise traditionally difficult to leach ores, such as chalcopyrite ores. International Patent Application PCT/AU2004/001597 (WO 2005/056842) describes such a process, as does PCT/AU2004/000236 (WO 2004/081241), in which the heap leach is conducted at a temperature intended to allow certain bacterial species, introduced into the heap, to operate. The process of PCT/AU2004/000236 utilises the presence of mesophilic bacterial species to raise the temperature of the heap to a point at which thermophilic bacterial species will operate to biooxidise the chalcopyrite present. U.S. Pat. No. 6,110,253 also describes biooxidation in a heap leach for a chalcopyrite ore but uses an external source of heat, such as heated leach solution or the use of hot air or steam in the pipe work used to introduce oxygen to the heap.

The present invention has as one object thereof to overcome substantially the problems or disadvantages associated with the above prior art, or to at least provide a useful alternative by which those processes may be operated.

The preceding discussion of the background art is intended to facilitate an understanding of the present invention only. It should be appreciated that the discussion is not an acknowledgement or admission that any of the material referred to was part of the common general knowledge in either Australia or any other territory as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention there is provided a process for the heap leaching of sulphide ores, the process characterised by the process steps of:
(i) The agglomeration or wetting of an ore feed;
(ii) Exposing the agglomerated or wetted ore to an inoculum containing one or more bacterial species capable of biooxidising sulphide minerals in that ore;
(iii) Forming one or more heaps from the ore of step (ii);
(iv) Dispersing further bacterial inoculum over at least a portion of the or each heap; and
(v) Recovering leach solution draining from the heap and passing a portion thereof to a means for metal recovery,
wherein step (i) is conducted in an agglomerator and step (ii) takes place at or near an end of the agglomerator from which the agglomerated or wetted ore exits.

Preferably, a bacterial farm is provided, the bacterial farm supplying the bacterial inoculum for addition to the agglomerated or wetted ore of step (i) and also for addition to the or each heap as in step (iv).

One or more leach solution ponds may be provided to receive leach solution from the or each heap. Leach solution from the or each leach solution pond is preferably recirculated to the or each heap. The leach solution ponds may also receive bacterial inoculum from the bacterial farm.

The portion of the leach solution from the or each heap that is fed to the means for metal recovery is preferably taken from the leach solution prior to it passing to the leach solution ponds.

The process of the present invention further comprises the combination of a stock bacterial culture with a sample or portion of the ore that is used in step (i) in the bacterial farm so as to adapt the stock bacterial culture to that ore. The bacterial farm also allows adaptation of the stock bacterial culture to the available site water, which may be particularly saline or have other contaminants.

The bacterial farm is preferably operated on a continuous basis. The continual operation of the bacterial farm is facilitated in part by the ability to direct the product of that farm to either the ore at step (ii), the or each heap and/or the or each leach solution pond.

In accordance with the present invention there is further provided a process for the heap leaching of sulphide ores, the process characterised by the process steps of:
(i) Providing a bacterial farm for the production of a bacterial culture capable of biooxidising sulphide minerals in the ore;
(ii) Distributing bacterial culture from that farm to inoculate each of an ore feed in an agglomeration or wetting step, one or more heaps, and one or more ponds arranged to receive leach solution from the or each heap, wherein the specific demands of the process determine the manner in which this distribution is balanced and the wherein inoculation of the ore feed is conducted in an agglomerator and takes place at or near an end of the agglomerator from which the agglomerated or wetted ore exits.

The bacterial farm preferably involves the exposure of a portion of the ore feed to be oxidised to a stock bacterial culture not indigenous to that ore so as to precondition or adapt the stock bacterial culture to that ore.

In accordance with the present invention ore is first mined in known manner and forwarded to a comminution process, in which the ore is crushed to a pre-determined size.

The crushed ore is subsequently passed to an agglomeration or wetting step. In the agglomeration or wetting step, to be explained in detail hereinafter, the crushed ore is firstly agglomerated or wetted and is subsequently inoculated with a bacterial inoculum.

Ore from the agglomeration or wetting step is then passed from that step to a conveyor and is used to stack one or more heaps.

A bacterial farm is provided for the substantially continuous generation of an adapted bacterial culture. The bacterial farm is temperature controlled, agitated and aerated. Further, one or more nutrients, such as potassium, nitrogen, phosphorous and magnesium may also be added to the bacterial farm as considered necessary for the prevailing conditions.

The bacterial farm is positioned on site so as to allow feeding of bacterial inoculum to the agglomeration or wetting step, to feed bacterial inoculum to the or each heap, or to feed bacterial inoculum to one or more leach solutions ponds. The three potential feeds for the bacterial inoculum allows the bacterial farm to operate on a substantially continuous basis such that if one destination for the bacterial inoculum, for process reasons unavailable, one or more of the remaining options may be appropriate.

The bacterial farm is provided with a portion of crushed ore so as to allow the adaptation of a stock bacterial culture to the sulphide mineralology of that crushed ore and any other specific environmental conditions, such as the salinity of site water. In this regard we refer to the disclosure of International Patent Application PCT/AU00/01022 (WO 01/18264 A1) and also US 2004-0206208-A1, the entire content of each being incorporated herein by reference.

The or each heap is arranged in generally known manner to drain leach solution therefrom to the one or more leach solution ponds.

The or each heap is provided with a means for irrigation such that each heap can be supplied with water, dissolved oxygen, acid, bacterial inoculum, and/or nutrients, or any combination of these, if and when considered appropriate.

Liquor from the leach solution pond(s) is recirculated over the or each heap as appropriate. A bleed steam of the liquor or pregnant leach solution from the or each heap is taken prior to the leach solution ponds and passed to a means for metal recovery. The means may comprise solvent exchange and electrowinning steps to recover copper if the sulphide mineral of the crushed ore were chalcopyrite, for example.

The or each heap is formed in largely known manner. However, this may be described in summary as the provision of an impermeable membrane on a pre-prepared pad. The membrane may comprise clay or HDPE, or may be a combination of both or of other suitable material. Suitability of such a material is defined by it being of low or zero permeability to the leach solution that is expected to flow from the or each heap.

The preparation of a pad includes the provision of means to facilitate drainage of leach solution from the heap stacked thereon. This means to facilitate drainage may comprise a layer of coarse crushed rock or ore, or an arrangement of drainage pipe, for example.

The or each heap is stacked in a manner that allows aeration of the heap and may include the provision of perpetrated pipes in the heap through which air and other gases or gaseous mixtures can be blown.

The agglomeration or wetting step comprises passing the crushed ore to an agglomerator at a first end thereof. Also introduced to the agglomerator at or near the first end is at least one or more of water, binder and acid. This occurs in roughly the first two thirds of the agglomerator in an area designating the agglomeration or wetting zone. As the crushed ore passes along the length of the agglomerator it passes from the agglomeration or wetting zone into the remaining portion of the agglomerator, designating the inoculation zone. At or near a second end of the agglomerator is provided an inlet, for example one or more spray jets for the bacterial inoculum. In this manner bacterial inoculum from the bacterial farm is sprayed onto the crushed ore shortly before that agglomerated crushed ore exits the agglomerator.

Agglomerated ore passes from the second end of the agglomerator drum to one or more conveyor belts that pass the agglomerated ore to the heap(s). The bacterial inoculum may, either in addition to or instead of introduction to the agglomerator, be sprayed onto the agglomerated ore through a spray or sprays as it is transported on the or each conveyor belt.

In accordance with the present invention there is still further provided an agglomeration method for the agglomeration of a sulphide ore to be heap leached, the agglomeration method being characterised by the following method steps:
(i) At least in part agglomerating the ore with one or more of an acid, a binder and water;
(ii) Adding a bacterial inoculum, of bacteria capable of oxidising sulphides to the at least partially agglomerated ore of step (i);
(iii) The consequently agglomerated ore is subsequently stacked in one or more heaps for leaching; and
wherein step (i) is conducted in an agglomerator and step (ii) takes place at or near an end of the agglomerator from which the agglomerated or wetted ore exits.

The effective inoculation of the agglomerated ore, prior to stacking of the heaps, aids in the even distribution of the adapted bacterial culture or inoculum supplied from the bacterial farm. The even distribution of the bacterial inoculum throughout the heap minimises any lag associated with the need for bacteria to populate the heap. In addition, the exposure of the bacterial inoculum to the agglomerated ore at this early stage allows oxidation of the sulphide mineral, or leaching, to commence immediately should the mineralogy of the sulphide ore and conditions be appropriate.

It is to be understood that stacking of the or each heap is effectively a continuous process, thereby requiring the substantially continuous operation of the bacterial farm. This is one reason the provision of a substantially continually operable bacterial farm is seen as advantageous to the heap leaching of sulphide ores.

BRIEF DESCRIPTION OF THE DRAWINGS

The present invention will now be describe, by way of example only, with reference to one embodiment thereof and the accompanying drawings, in which:—

FIG. 2 is a schematic representation of the agglomeration or wetting step and the introduction of the bacterial inoculum step of the process of FIG. 1.

BEST MODE(S) FOR CARRYING OUT THE INVENTION

Figure 1:
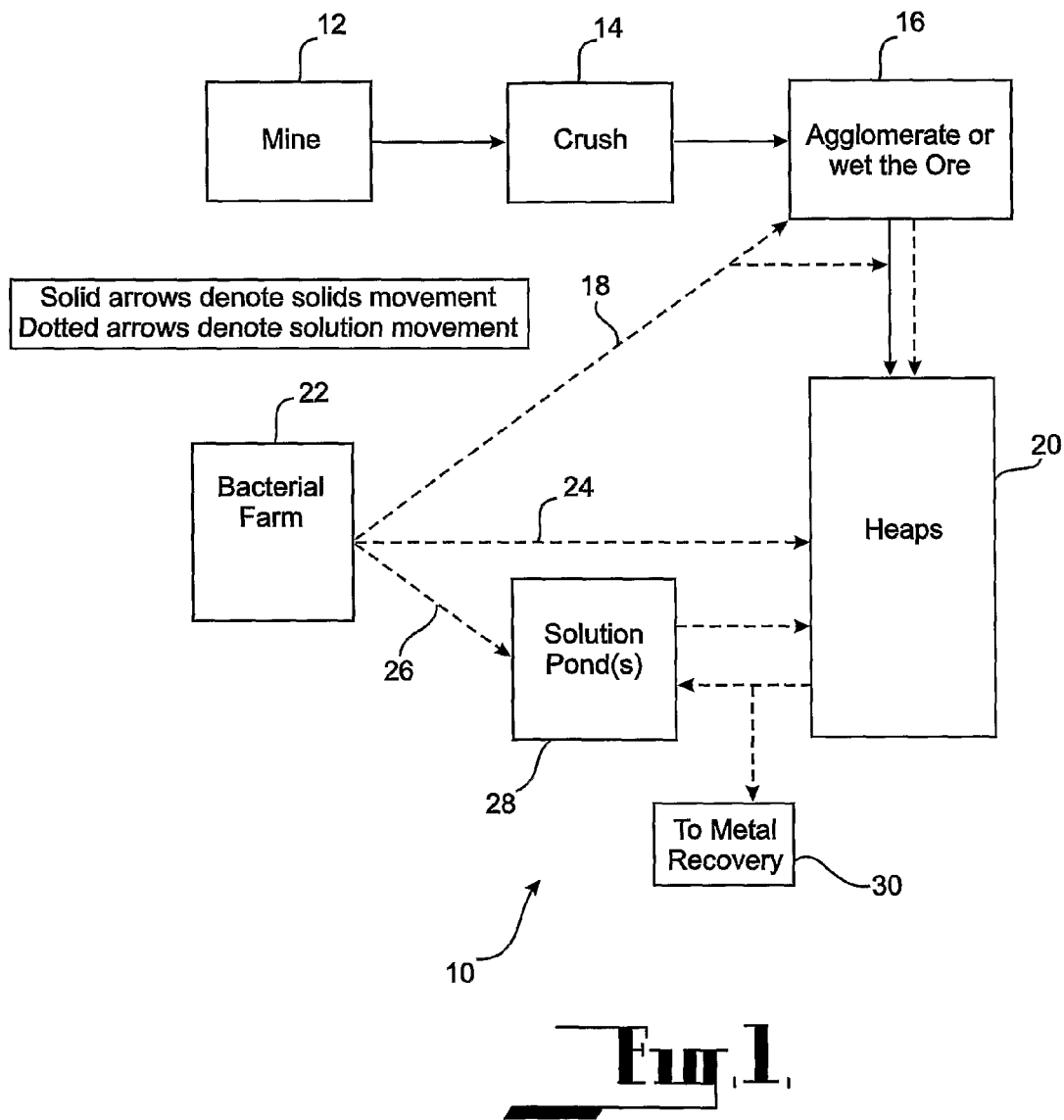
FIG. 1 is a schematic diagram of the process for heap leaching of sulphide ores in accordance with the present invention.

A process 10 for the heap leaching of sulphide ores in accordance with the present invention is shown in FIG. 1. Ore is first mined 12 in known manner and forwarded to a comminution process 14, in which the ore is crushed to a predetermined size. The size is in the range of about 2 mm to 200 mm and is determined by the liberation characteristics of the sulphides present. It is envisaged that larger sizes may be tolerated in certain circumstances, including the application of the present invention to use with dumps.

The crushed ore is subsequently passed to an agglomeration or wetting step 16. In the agglomeration or wetting step 16, to be explained in detail hereinafter, the crushed ore is firstly agglomerated or wetted and is subsequently inoculated with a bacterial inoculum 18.

Ore from the agglomeration or wetting step 16 is then passed from that step to a conveyor and is used to stack one or more heaps 20.

A bacterial farm 22 is provided for the substantially continuous generation of an adapted bacterial culture. The bacterial farm comprises a series of temperature controlled, agitated and aerated tanks. Further, one or more nutrients, such as potassium, nitrogen, phosphorous and magnesium may also be added to the bacterial farm as considered necessary for the prevailing conditions.

The bacterial farm 22 is positioned on site so as to allow feeding of bacterial inoculum 18 to the agglomeration or wetting step 16, to feed bacterial inoculum 24 to the or each heap 20, or to feed bacterial inoculum 26 to one or more leach solutions ponds 28. The three potential feeds 18, 24 and 26 for the bacterial inoculum allows the bacterial farm 22 to operate on a substantially continuous basis such that if one destination for the bacterial inoculum is unavailable, for process reasons, one or more of the remaining options may be appropriate.

The bacterial farm 22 is provided with a portion of finely ground crushed ore 14 so as to allow the adaptation of a stock bacterial culture to the sulphide mineralology of that crushed ore and any other specific environmental conditions, such as the salinity of site water. In this regard we refer to the disclosure of International Patent Application PCT/AU00/01022 (WO 01/18264 A1) and also US 2004-0206208-A1, the entire content of each being incorporated herein by reference.

The amount of the finely ground crushed ore 14 fed to the bacterial farm is sufficient to provide a thin pulp of less than or equal to 1% solids. The pulp retention time in the bacterial farm 22 is sufficient for the bacteria to multiply in number such that a significant population of bacteria are always present, preferably in the order of $10^6$ and $10^9$ bacteria per milliliter of solution. In one form of the invention this is a two stage process, the first being the oxidation of sulphides by the bacteria in which the bacteria multiply in number. The second stage is typified by detaching of the bacteria from the solids, which will be largely oxidised, and their being available to attach to fresh solids. The retention time for the pulp in each of these stages is expected to be in the order of 2 days each.

The or each heap 20 is arranged in generally known manner to drain leach solution therefrom to the one or more leach solution ponds 28.

The or each heap 20 is provided with a means for irrigation (not shown) such that each heap can be supplied with water, dissolved oxygen, acid, bacterial inoculum, and/or nutrients, or any combination of these, if and when considered appropriate.

Liquor from the leach solution pond(s) is recirculated over the or each heap 20 as appropriate, although such recirculation may be regular. A bleed steam of the liquor or pregnant leach solution from the or each heap 20 is taken prior to the leach solution ponds 28 and passed to a means for metal recovery 30.

The or each heap 20 is formed in largely known manner. However, this may be described in summary as the provision of an impermeable membrane on a pre-prepared pad. The membrane may comprise clay or HDPE, or may be a combination of both or of other suitable material. Suitability of such a material is defined by it being of low or zero permeability to the leach solution that is expected to flow from the or each heap 20.

The preparation of a pad includes the provision of means to facilitate drainage of leach solution from the heap stacked thereon. This means to facilitate drainage may comprise a layer of coarse crushed rock or ore, or an arrangement of drainage pipe, for example.

The or each heap 20 is stacked in a manner that allows aeration of the heap and may include the provision of perforated pipes in the heap through which air and other gases or gaseous mixtures can be blown.

In FIG. 2 there is shown an agglomeration or wetting step 16 in combination with the introduction of the bacterial inoculum 18 as described hereinabove. The agglomeration or wetting step 16 comprises passing the crushed ore to a drum agglomerator 32 at a first end 34 thereof. Also introduced to the drum agglomerator 32 at or near the first end 34 is at least one or more of water 36, a binder, for example a polymeric binder 38, and acid 40. This occurs in roughly the first two thirds of the agglomerator drum 32 in an area designated the agglomeration or wetting zone 42. As the crushed ore passes along the length of the agglomerator drum 32 it passes from the agglomeration or wetting zone 42 into the remaining portion of the agglomerator drum 32, designated the inoculation zone 44. At or near a second end 46 of the agglomerator drum 32 is provided an inlet, for example one or more spray jets 48, for the bacterial inoculum 18. In this manner bacterial inoculum 18 from the bacterial farm 22 is sprayed onto the crushed ore shortly before that agglomerated crushed ore exits the agglomerator drum 32.

The agglomerated crushed ore will have a moisture content of between 2 to 20% in the majority of cases, dependent upon the crush size of the ore and its particular mineralogy, such as clay content.

Agglomerated ore 50 passes from the second end 36 of the agglomerator drum 32 to one or more conveyor belts 52 that pass the agglomerated ore 50 to the heaps 20. The bacterial inoculum 18 may, either in addition to or instead of introduction to the agglomerator drum 32, be sprayed onto the agglomerated ore 50 through a spray or sprays 54 as it is transported on the or each conveyor belt 52.

The effective inoculation of the agglomerated ore, prior to stacking of the heaps 20, aids in the even distribution of the adapted bacterial culture or inoculum 18 supplied from the bacterial farm 22. The even distribution of the bacterial inoculum 18 throughout the heap minimises any lag associated with the need for bacteria to populate the heap 20. In addition, the exposure of the bacterial inoculum 18 to the agglomerated ore at this early stage allows oxidation of the sulphide mineral, or leaching, to commence immediately should the mineralogy of the sulphide ore and conditions be appropriate.

The specific mechanism for the inoculation of the ore during agglomeration as described herein also ensures as far as reasonably possible that the inoculum is not exposed to full extent of the harsh physical conditions of the agglomeration process itself. For example, the addition of the bacterial inoculum at or near the second end 36 of the agglomerator drum 32 minimises the exposure of the bacteria in the inoculum to the severe conditions of agglomeration, including the abrasive and shearing forces that may be experienced. As such, a more effective inoculation should result from the agglomeration method of the present invention when compared with methods of the prior art.

It is to be understood that stacking of the or each heap 20 is effectively a continuous process, thereby requiring the substantially continuous operation of the bacterial farm 22. This is one reason the provision of a substantially continually operable bacterial farm is seen as advantageous to the heap leaching of sulphide ores. Further, having a number of options available for the distribution of bacterial culture from the bacterial farm 22 allows its substantially continual operation. That is, the adapted bacterial culture or inoculum product of the bacterial farm 22 may be distributed to one or more of agglomeration or wetting, to the ponds feeding the or each heap, and/or directly to the or each heap. Ultimately, it is envisaged that the process of the present invention is such that it will allow a heap leach operation using bio-oxidation to run more efficiently and cost effectively than those of the prior art.

Modifications and variations such as would be apparent to the skilled addressee are considered to fall within the scope of the present invention.

The invention claimed is:

1. A process for the heap leaching of sulphide ores, the process characterised by the process steps of:
    (i) The agglomeration or wetting of an ore feed;
    (ii) Exposing the agglomerated or wetted ore to an inoculum containing one or more bacterial species capable of biooxidising sulphide minerals in that ore;
    (iii) Forming one or more heaps from the ore of step (ii);
    (iv) Dispersing further bacterial inoculum over at least a portion of the or each heap; and
    (v) Recovering leach solution draining from the heap and passing a portion thereof to a means for metal recovery, wherein step (i) is conducted in an agglomerator and step (ii) takes place at or near an end of the agglomerator from which the agglomerated or wetted ore exits.

2. A process according to claim 1, wherein a bacterial farm is provided to supply the bacterial inoculum for addition to the agglomerated or wetted ore of step (i) and for addition to the or each heap as in step (iv).

3. A process according to claim 1, wherein one or more leach solution ponds are provided to receive leach solution from the or each heap.

4. A process according to claim 3, wherein leach solution from the or each leach solution pond is recirculated to the or each heap.

5. A process according to claim 3, wherein the leach solution ponds also receive bacterial inoculum from the bacterial farm.

6. A process according to claim 3, wherein the portion of the leach solution from the or each heap that is fed to the means for metal recovery is drawn from the leach solution prior to it passing to the leach solution ponds.

7. A process according to claim 2, wherein the process further comprises the combination of a stock bacterial culture with a sample or portion of the ore that is used in step (i) in the bacterial farm so as to adapt the stock bacterial culture to that ore.

8. A process according to claim 2, wherein the bacterial farm allows adaptation of the stock bacterial culture to the available site water.

9. A process according to claim 2, wherein the bacterial farm is operated on a continuous basis.

10. A process according to claim 9, wherein the continuous operation of the bacterial farm is facilitated in part by the ability to direct the product of that farm to either the ore at step (ii), the or each heap and/or the or each leach solution pond.

11. A process according to claim 10, wherein ore forming the ore feed of step (i) is first mined and forwarded to a comminution process, in which the ore is crushed to a predetermined size.

12. A process according to claim 11, wherein agglomerated or wetted ore from step (ii) is passed from that step to a conveyor and is used to stack the one or more heaps of step (iii).

13. A process according to claim 1, wherein the agglomeration or wetting step comprises passing the crushed ore to the agglomerator at a first end thereof.

14. A process according to claim 13, wherein at least one or more of water, binder and acid are introduced to the agglomerator at or near the first end thereof.

15. A process according to claim 14, wherein the first end of the agglomerator is constituted by about the first two thirds of the agglomerator in an area designated the agglomeration or wetting zone.

16. A process according to claim 15, wherein as the crushed ore passes along the length of the agglomerator it passes from the agglomeration or wetting zone into the remaining portion of the agglomerator, designated the inoculation zone.

17. A process according to claim 13, wherein at or near a second end of the agglomerator is provided an inoculum inlet.

18. A process according to claim 17, wherein the inoculum inlet is provided in the form of one or more spray jets.

19. A process according to claim 17, wherein agglomerated ore passes from the second end of the agglomerator to one or more conveyor belts that pass the agglomerated ore to the or each heap.

20. A process according to claim 13, wherein the bacterial inoculum, either in addition to or instead of introduction to the agglomerator, is sprayed onto the agglomerated ore through a spray or sprays as it is transported to the or each heap.

21. A process for the heap leaching of sulphide ores, the process characterised by the process steps of:
    (i) Providing a bacterial farm for the production of a bacterial culture capable of biooxidising sulphide minerals in the ore; and
    (ii) Distributing bacterial culture from that farm to inoculate each of an ore feed in an agglomeration or wetting step, one or more heaps, and one or more ponds arranged to receive leach solution from the or each heap, wherein the specific demands of the process determine the manner in which this distribution is balanced and the wherein inoculation of the ore feed is conducted in an agglomerator and takes place at or near an end of the agglomerator from which the agglomerated or wetted ore exits.

22. A process according to claim 21, wherein the bacterial farm includes the exposure of a portion of the ore feed to be oxidised to a stock bacterial culture not indigenous to that ore so as to precondition or adapt the stock bacterial culture to that ore.

23. A process according to claim 21, wherein the bacterial farm is temperature controlled, agitated and aerated.

24. A process according to claim 21, wherein one or more nutrients are added to the bacterial farm as necessary for the prevailing conditions.

25. A process according to claim 21, wherein the bacterial farm is positioned on site so as to allow feeding of bacterial inoculum to the agglomeration or wetting step, to feed bacterial inoculum to the or each heap, or to feed bacterial inoculum to one or more leach solutions ponds.

26. A process according to claim 25, wherein the three potential feeds for the bacterial inoculum allows the bacterial farm to operate on a substantially continuous basis such that if one destination for the bacterial inoculum is unavailable, for process reasons, one or more of the remaining options may be appropriate.

27. A process according to claim 21, wherein the bacterial farm is provided with a portion of crushed ore so as to allow the adaptation of a stock bacterial culture to the sulphide mineralology of that crushed ore and any specific environmental conditions.

28. An agglomeration method for the agglomeration of a sulphide ore to be heap leached, the agglomeration method being characterised by the following method steps:
(i) At least in part agglomerating the ore with one or more of an acid, a binder and water;
(ii) Adding a bacterial inoculum of bacteria capable of oxidising sulphides to the at least partially agglomerated ore of step (i); and
(iii) The consequently agglomerated ore is subsequently stacked in one or more heaps for leaching,
wherein step (i) is conducted in an agglomerator and step (ii) takes place at or near an end of the agglomerator from which the agglomerated or wetted ore exits.

* * * * *